United States Patent
Nguyen et al.

(10) Patent No.: US 10,197,692 B2
(45) Date of Patent: Feb. 5, 2019

(54) VALIDATION OF DEPTH-DEPTH CURVES USING TIME-SEISMIC DEPTH INTERVAL VELOCITY

(71) Applicant: Landmark Graphics Corporation, Houston, TX (US)

(72) Inventors: Nam Xuan Nguyen, Katy, TX (US); Eugene Carey Heinrichs, Calgary (CA)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/902,160

(22) PCT Filed: Mar. 11, 2014

(86) PCT No.: PCT/US2014/023716
§ 371 (c)(1),
(2) Date: Dec. 30, 2015

(87) PCT Pub. No.: WO2015/137932
PCT Pub. Date: Sep. 17, 2015

(65) Prior Publication Data
US 2016/0146965 A1    May 26, 2016

(51) Int. Cl.
*G01V 1/50* (2006.01)
*G01V 1/40* (2006.01)
*G01V 1/30* (2006.01)

(52) U.S. Cl.
CPC ............ *G01V 1/50* (2013.01); *G01V 1/303* (2013.01); *G01V 1/40* (2013.01); *G01V 2210/61* (2013.01)

(58) Field of Classification Search
CPC .... G01V 1/303; G01V 1/282; G01V 2210/66; G01V 1/306; G01V 1/50; G01V 2210/667
See application file for complete search history.

(56) References Cited

U.S. PATENT DOCUMENTS

| | | | | |
|---|---|---|---|---|
| 3,898,610 A | * | 8/1975 | Pennebaker, Jr. | G01V 1/30 367/33 |
| 5,587,942 A | | 12/1996 | Krebs | |
| 6,131,694 A | * | 10/2000 | Robbins | G01V 1/282 181/103 |
| 6,681,185 B1 | * | 1/2004 | Young | G01V 1/30 367/38 |
| 8,594,939 B2 | | 11/2013 | Docherty | |
| 2006/0256657 A1 | * | 11/2006 | Robinson | G01V 1/40 367/38 |
| 2010/0195437 A1 | | 8/2010 | Bjerkholt | |
| 2012/0053841 A1 | | 3/2012 | Li et al. | |
| 2014/0347957 A1 | * | 11/2014 | Hartog | G01V 1/42 367/33 |

OTHER PUBLICATIONS

International Search Report and Written Opinion; PCT Application No. PCT/US2014/023716; dated Dec. 15, 2014.
Extended European Search Report; European Application No. 14885098.5; dated May 19, 2017.

* cited by examiner

*Primary Examiner* — Jaehwan Oh
(74) *Attorney, Agent, or Firm* — Polsinelli PC

(57) ABSTRACT

Systems and methods using a time-seismic-depth interval velocity curve and the difference between a time-depth interval velocity curve and a time-seismic depth interval velocity curve for validating depth-depth curves which calibrate a synthetic generated from well logs to depth seismic data.

20 Claims, 4 Drawing Sheets

VALIDATION OF DEPTH-DEPTH CURVES USING TIME-SEISMIC DEPTH INTERVAL VELOCITY

CROSS-REFERENCE TO RELATED APPLICATIONS

This application claims the priority of PCT Patent Application No. PCT/US14/23716, filed on Mar. 11, 2014, which is incorporated herein by reference.

STATEMENT REGARDING FEDERALLY SPONSORED RESEARCH

Not applicable.

FIELD OF THE DISCLOSURE

The present disclosure generally relates to systems and methods using time-seismic depth interval velocity for validating depth-depth curves which calibrate a synthetic generated from well logs to depth seismic data. More particularly, the present disclosure relates to validating depth-depth curves using a time-seismic-depth interval velocity curve and the difference between a time-depth interval velocity curve and a time-seismic depth interval velocity curve.

BACKGROUND

Recorded seismic data has a vertical axis in two-way time. In exploration areas in which subsurface geology is highly structured and the propagation velocity of seismic energy in the rock layers is highly variable, the time seismic is migrated in depth domain generating depth seismic, which has a vertical axis in depth, using a velocity model that provides an estimate of seismic velocity in the various rock layers. The depth seismic gives a more accurate image of the subsurface for the purpose of interpreting geologic structures, finding prospective hydrocarbon traps and planning a drilling program.

The goal of seismic interpretation is to quickly, easily, and confidently correlate what is seen in the seismic depth images with meaningful geologic events represented by data from existing wells in the area. In complex geologic environments, this can be challenging because the velocity model used to depth-migrate the seismic data is only an estimate of real subsurface velocities. As a result, the depths of seismic events seen in the depth seismic do not match the true vertical depths of corresponding geologic events seen in the well data. A depth-depth curve or mapping must be used to calibrate seismic depths to true vertical depths, thereby making it possible to correlate events seen in the depth seismic image to variations in rock layers as seen in the well data. Finding the correct depth-depth mapping is an iterative process in which the interpreter attempts to match corresponding events between the depth seismic and a synthetic trace (i.e. a model of a seismic trace computed from well data), which causes the depth-depth mapping to be updated resulting in a shift or stretch/squeeze being applied to the vertical axis of either the displayed well data and synthetic trace or the displayed seismic data. The interpreter then rechecks the match of well data and seismic data at all events of interest and repeats the depth-depth editing process as necessary.

Calibrating seismic depths to true vertical depths in this manner in order to correctly correlate seismic events to geologic events is challenging because of the uncertainty in the estimate of seismic velocities used to create the depth seismic and the possibility of mismatching seismic events to events in the synthetic trace. Consequently, it is critical to validate the depth-depth mapping to make sure that it makes geologic sense. Current methods used to validate depth-depth curves may produce values such as a percentage stretch over the various depth intervals in a depth-depth curve, or simply the difference between true vertical depth and seismic depth at each pair of depth-depth values in the curve. Neither of these quantities relate to geologic rock properties, which makes it difficult to validate the geologic reasonableness of the depth-depth mapping contained in a depth-depth curve using such methods.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
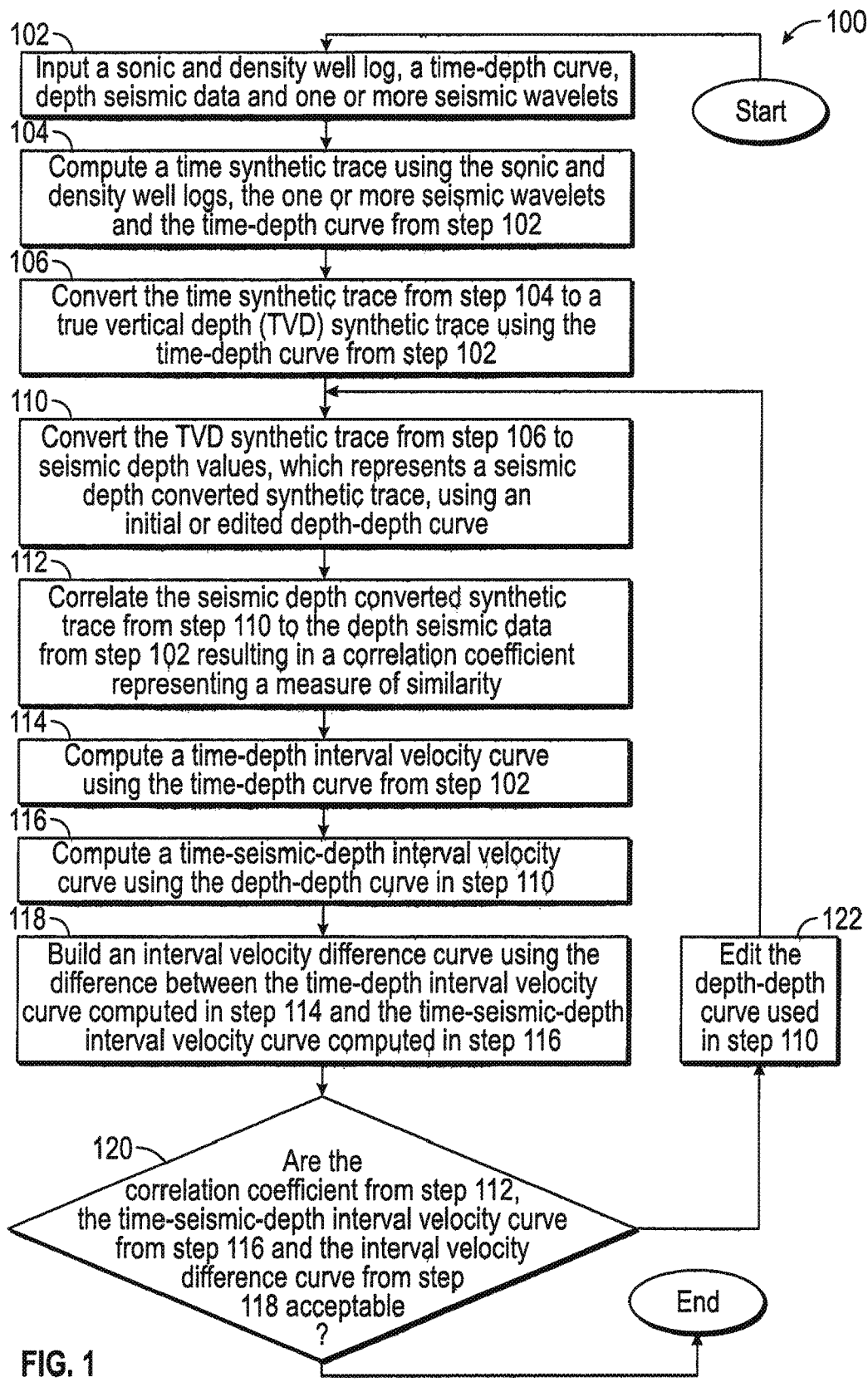
FIG. 1 is a flow diagram illustrating one embodiment of a method for implementing the present disclosure.

The present disclosure overcomes one or more deficiencies in the prior art by providing systems and methods for validating depth-depth curves using a time-seismic-depth interval velocity curve and the difference between a time-depth interval velocity curve and a time-seismic depth interval velocity curve.

In one embodiment, the present disclosure includes a method for validating a depth-depth curve that is used to calibrate seismic depths to true vertical depths, which comprises: i) computing a time-seismic-depth interval velocity curve using the depth-depth curve and a computer system; ii) building an interval velocity difference curve using a difference between a time depth interval velocity curve and the time-seismic-depth interval velocity curve; and iii) validating the depth-depth curve using the time-seismic-depth interval velocity curve and the interval velocity difference curve.

In another embodiment, the present disclosure includes a non-transitory program carrier device tangibly carrying computer-executable instructions for validating a depth-depth curve that is used to calibrate seismic depths to true vertical depths, the instructions being executable to implement: i) computing a time-seismic-depth interval velocity curve using the depth-depth curve; ii) building an interval velocity difference curve using a difference between a time depth interval velocity curve and the time-seismic-depth interval velocity curve; and iii) validating the depth-depth curve using the time-seismic-depth interval velocity curve and the interval velocity difference curve.

In yet another embodiment, the present disclosure includes a non-transitory program carrier device tangibly carrying computer-executable instructions for validating a depth-depth curve that is used to calibrate seismic depths to true vertical depths, the instructions being executable to implement: i) computing a time-seismic-depth interval velocity curve using the depth-depth curve and a computer system; ii) building an interval velocity difference curve using a difference between a time depth interval velocity curve and the time-seismic-depth interval velocity curve; and iii) validating the depth-depth curve using the time-seismic-depth interval velocity curve, the interval velocity difference curve and a correlation coefficient.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Referring now to FIGS. 1A-1B, a flow diagram illustrates one embodiment of a method 100 for implementing the present disclosure. The method 100 validates a depth-depth curve that is used to correlate well data registered to true vertical depths and seismic data registered to seismic depths. The depth-depth curve comprises irregularly sampled pairs of true vertical depth values and seismic depth values. The method 100 validates the depth-depth curve by using a computed time-seismic-depth interval velocity curve and an interval velocity difference curve, which represents the difference between the time-seismic-depth interval velocity curve and a computed time-depth interval velocity curve. These computed curves relate the true vertical depth/seismic depth mapping contained in a depth-depth curve to the geologic property of seismic velocity, which interpreters generally have a good feeling for in their project area. Using a geologic property such as seismic interval velocity to help validate a depth-depth curve significantly reduces the risk of the interpreter forcing a depth-depth mapping of well data to seismic data that is geologically unreasonable.

Figure 4:
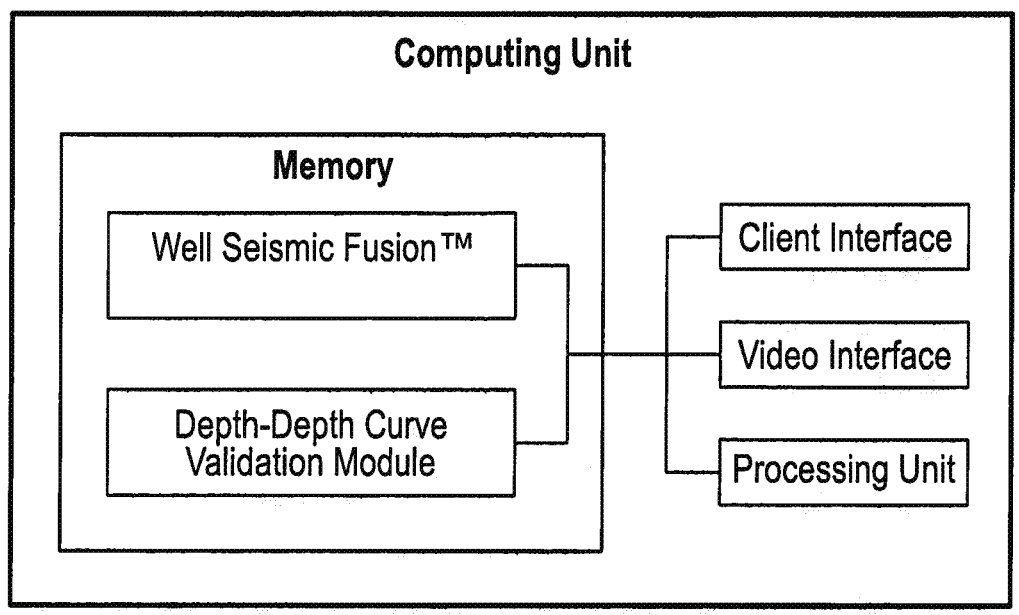
FIG. 4 is a block diagram illustrating one embodiment of a computer system for implementing the present disclosure.

In step 102, data is input for the method 100, which includes a sonic and a density well log, a time-depth curve that correlates seismic time values to true vertical depth values from well data, depth seismic data and one or more seismic wavelets using the client interface and/or the video interface described in reference to FIG. 4.

In step 104, a time synthetic trace is computed using techniques well known in the art and the sonic and density well logs, the one or more seismic wavelets and the time-depth curve from step 102. An exemplary sonic well log and an exemplary density well log are illustrated in columns 3-4, respectively, of the chart 300 in FIG. 3.

In step 106, the time synthetic trace from step 104 is converted to a true vertical depth (TVD) synthetic trace using the time-depth curve from step 102 and techniques well known in the art.

In step 110, the TVD synthetic trace from step 106 is converted to seismic depth values, which represents a seismic depth converted synthetic trace, using an initial or edited depth-depth curve that correlates the true vertical depth values in the TVD synthetic trace to seismic depth values. An exemplary seismic depth converted synthetic trace is illustrated in column 8 of the chart 300 in FIG. 3.

In step 112, the seismic depth converted synthetic trace from step 110 is correlated to the depth seismic data from step 102 using well known cross-correlation techniques that generate a correlation coefficient representing a measure of similarity. An exemplary cross-correlation trace is illustrated in column 10 of the chart 300 in FIG. 3.

In step 114, a time-depth interval velocity curve is computed using the time-depth curve from step 102 and techniques well known in the art. An exemplary time-depth interval velocity curve is illustrated in column 7 of the chart 300 in FIG. 3.

In step 116, a time-seismic-depth interval velocity curve is computed using the depth-depth curve used in step 110. An exemplary time-seismic-depth interval velocity curve is illustrated in column 7 of the chart 300 in FIG. 3. One embodiment of a method for performing this step is described further in reference to FIG. 2.

In step 118, an interval velocity difference curve is built using the difference between the time-depth interval velocity curve computed in step 114 and the time-seismic-depth interval velocity curve computed in step 116 and techniques well known in the art for building quality control log curves sampled in true vertical depth. An exemplary interval velocity difference curve is illustrated in column 6 of the chart 300 in FIG. 3.

In step 120, the method 100 determines if the correlation coefficient from step 112, the time-seismic-depth interval velocity curve from step 116 and the interval velocity difference curve from step 118 are acceptable. Acceptability may be determined using the client interface and/or the video interface described in reference to FIG. 4 and the results illustrated in FIG. 3. An acceptable correlation coefficient, for example, may be expected to be greater than 0.5. An acceptable time-seismic-depth interval velocity curve, for example, may have values that are relatively close to interval velocities (extracted at the well location) in the velocity model used to create the depth-migrated seismic data. An acceptable interval velocity difference curve, for example, may have values that are typically less than 10% of the velocities seen in the well. Computed values on the time-seismic-depth interval velocity curve from step 116 that differ significantly from the velocity model may indicate that a seismic event has been correlated to the wrong event in the synthetic trace computed from well data thus, resulting in a distorted time-seismic-depth interval velocity curve and interval velocity difference curve. If the interval velocity difference curve computed in step 118 has large values, then the time-depth curve from step 102 may be poor or seismic and synthetic events may have been miscorrelated thus, resulting in a bad depth-depth curve or a poor estimate of real velocities in the subsurface based on the velocity model used to process the depth seismic. On the other hand, if the time-seismic-depth interval velocity curve from step 116 is close to velocities in the velocity model and the difference between time-seismic-depth interval velocity curve and the time-depth interval velocity curve from step 114 is relatively small, then there is a high degree of confidence that the depth-depth curve mapping seismic depths to true vertical depths is sufficiently accurate and should allow for a correct interpretation of seismic events. If the correlation coefficient from step 112, the time-seismic-depth interval velocity curve from step 116 and the interval velocity difference curve from step 118 are each acceptable, then the method 100 ends because the depth-depth curve is therefore, validated. Otherwise, the method 100 proceeds to step 122.

In step 122, the depth-depth curve used in step 110 is edited by adjusting one or more of the seismic depth values in the depth-depth curve while maintaining the corresponding true vertical depth values and vice versa. Editing may be performed using the client interface and/or the video interface described in reference to FIG. 4 to interactively select one or more of the depth-depth pairs (tie points) illustrated in the center of column 8 in FIG. 3 as small squares and drag the tie points up or down along with the part of the synthetic trace within the range of the selected tie points until a desired alignment between one or more events on the synthetic trace to one or more events on the seismic traces is achieved. In this manner, the seismic depth values of each tie-point may be recalculated based on the distance of vertical drag. Pairs of true vertical depth values and seismic depth values may also be interactively inserted into the depth-depth curve or deleted. Editing the true vertical depth values and the seismic depth values may also be done in a table of values and by various other means. The edited depth-depth curve is returned to step 110.

Figure 2:
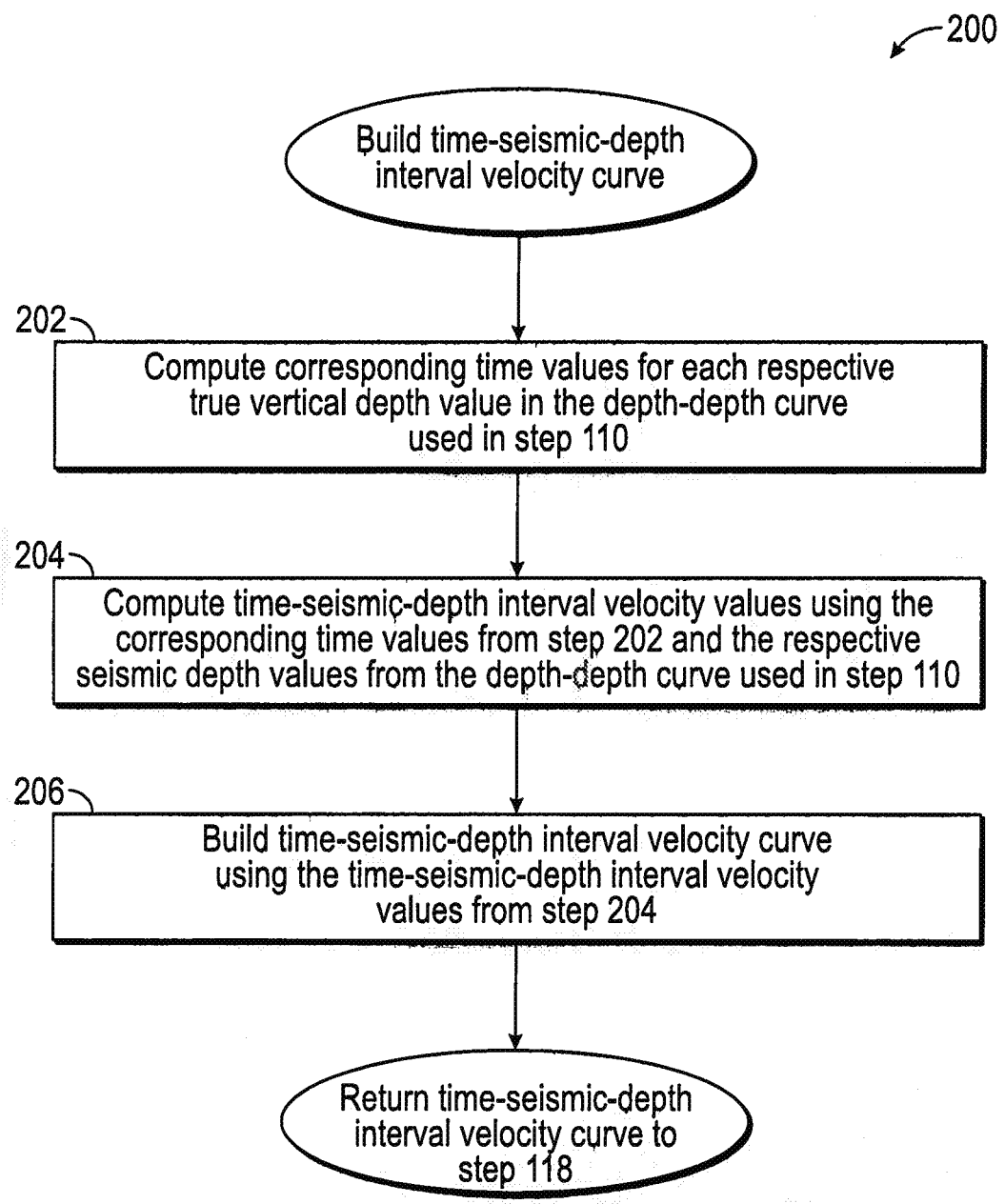
FIG. 2 is a flow diagram illustrating one embodiment of a method for performing step 116 in FIG. 1.

Referring now to FIG. 2, a flow diagram of one embodiment of a method 200 for performing step 116 in FIG. 1 is illustrated.

In step 202, corresponding time values are computed for each respective true vertical depth value in the depth-depth curve used in step 110 by linearly interpolating a time value using two pairs of time-vertical depth values in the time-depth curve from step 102 for each respective true vertical depth value in the depth-depth curve and techniques well known in the art for linear interpolation.

In step 204, time-seismic-depth interval velocity values are computed using the corresponding time values from step 202, the respective seismic depth values from the depth-depth curve used in step 110 and techniques well known in the art.

In step 206, a time-seismic-depth interval velocity curve is built using the time-seismic-depth interval velocity values from step 204 by setting the time-seismic-depth interval velocity values over respective intervals of the true vertical depth values from the depth-depth curve used in step 110. The time-seismic-depth interval velocity curve is returned to step 118 where it may be used to build quality control log curves sampled in true vertical depth.

The use of a time-seismic-depth interval velocity curve according to the method 100 is a major improvement in the validation of a depth-depth curve and will significantly improve confidence in the interpretation of depth seismic in difficult geologic regions. The use of a time-seismic-depth interval velocity curve bases validation of the depth-depth curve on the interpreter's understanding of the rock property of seismic velocity, and in particular by the interpreter being able to compare the calculated time-seismic-depth interval velocity with the known estimate of seismic velocities in the subsurface layers that was used to process the depth seismic. Using the method 100 to validate a depth-depth curve is thus, more accurate than simply looking at a percentage or absolute difference between true vertical depth values and corresponding seismic depth values or a percentage or absolute difference between true vertical depth intervals and seismic depth intervals and trying to validate these differences based on how much and in what direction the differences are reasonable. Additionally, the use of an interval velocity difference curve according to the method 100 provides a quantitative comparison of the variance between seismic processing velocities and geological velocities from well data. This allows interpreters to have a better understanding of the uncertainty in interpreting geologic structure from depth seismic.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. Well Seismic Fusion™, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 4, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

Figure 3:
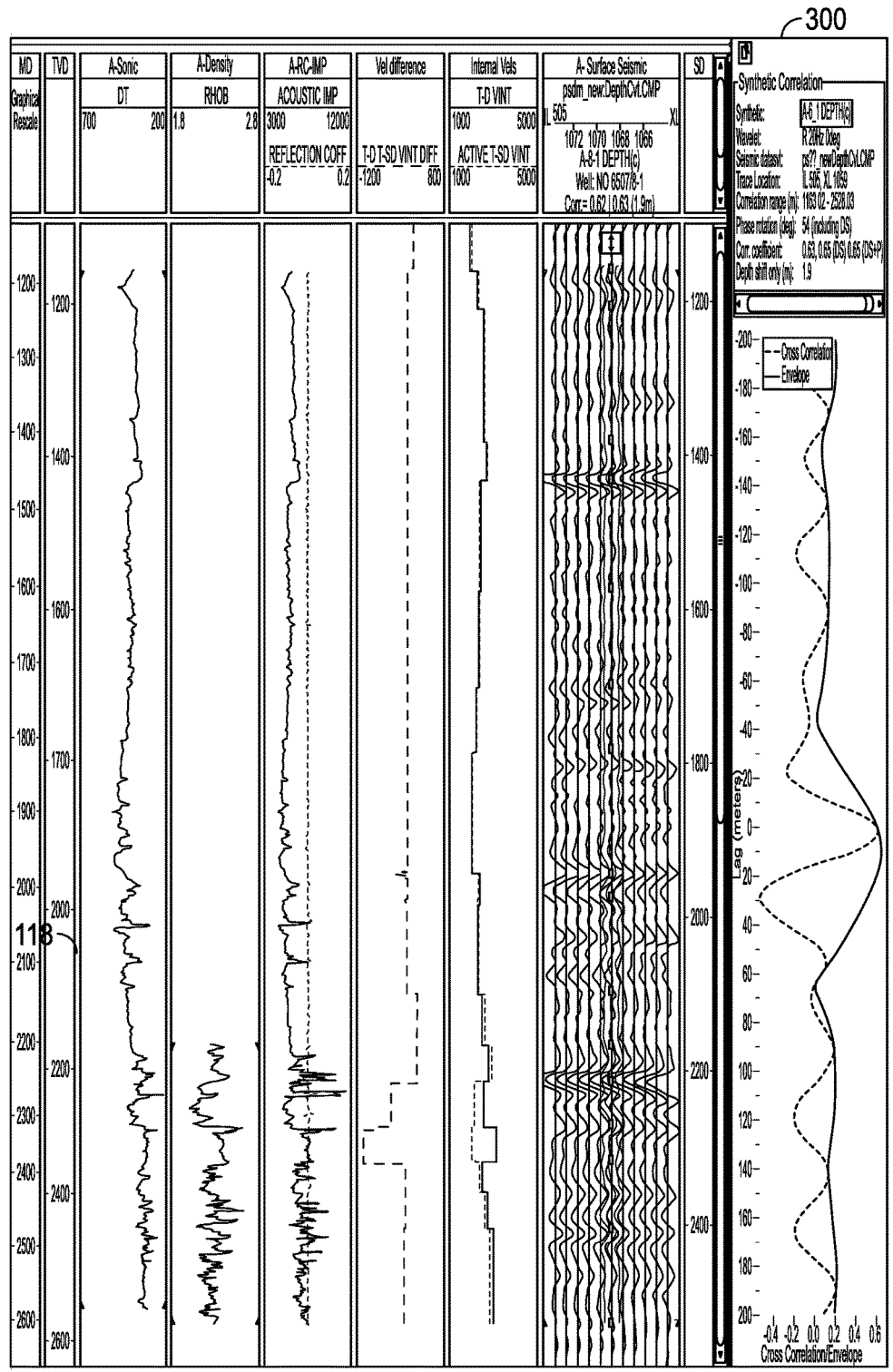
FIG. 3 is a chart illustrating the results of steps 112, 116 and 118 for use in step 120 of FIG. 1.

The memory primarily stares the application programs, which may also be described as program modules containing computer-executable instructions, executed by the computing unit for implementing the present disclosure described herein and illustrated in FIGS. 1-3. The memory therefore, includes a depth-depth curve validation module, which enables steps 116-118 described in reference to FIGS. 1-2. The depth-depth curve validation module may integrate functionality from the remaining application programs illustrated in FIG. 4. In particular, Well Seismic Fusion™, may be used as an interface application to perform the remaining steps in FIG. 1. Although Well Seismic Fusion™, may be used as interface application, other interface applications may be used, instead, or the depth-depth curve validation module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for validating a depth-depth curve that is used to calibrate seismic depths to true vertical depths, which comprises:
   computing a time-seismic-depth interval velocity curve using the depth-depth curve and a computer system;
   building an interval velocity difference curve using a difference between a time depth interval velocity curve and the time-seismic-depth interval velocity curve; and
   validating the depth-depth curve using the time-seismic-depth interval velocity curve and the interval velocity difference curve.

2. The method of claim 1, wherein the time-seismic-depth interval velocity curve is computed by:
   computing a time value for each respective true vertical depth value in the depth-depth curve;
   computing a time-seismic-depth interval velocity value for each computed time value using a respective time value and a respective seismic depth value from the depth-depth curve; and
   building the time-seismic-depth interval velocity curve using each time-seismic-depth interval velocity value.

3. The method of claim 2, wherein each time value is computed by linearly interpolating a time value using two pairs of time-vertical depth values in a time-depth curve for each respective true vertical depth value in the depth-depth curve.

4. The method of claim 2, wherein the time-seismic-depth interval velocity curve is built by setting time-seismic-depth interval velocity values over respective intervals of the true vertical depth values from the depth-depth curve.

5. The method of claim 1, further comprising validating the depth-depth curve using a correlation coefficient that represents a measure of similarity between a seismic-depth converted synthetic trace and depth seismic data.

6. The method of claim 5, wherein validating the depth-depth curve comprises determining whether the correlation coefficient, the time-seismic-depth interval velocity curve and the interval velocity difference curve are acceptable.

7. The method of claim 6, further comprising:
   editing the depth-depth curve; and
   repeating the steps in claim 1 until the correlation coefficient, the time-seismic-depth interval velocity curve and the interval velocity difference curve are acceptable.

8. The method of claim 7, wherein the depth-depth curve is edited by adjusting one of one or more of the seismic depth values in the depth-depth curve while maintaining each respective true vertical depth value and one or more of the true vertical depth values in the depth-depth curve while maintaining each respective seismic depth value.

9. A non-transitory program carrier device tangibly carrying computer-executable instructions for validating a depth-depth curve that is used to calibrate seismic depths to true vertical depths, the instructions being executable to implement:
   computing a time-seismic-depth interval velocity curve using the depth-depth curve;
   building an interval velocity difference curve using a difference between a time depth interval velocity curve and the time-seismic-depth interval velocity curve; and
   validating the depth-depth curve using the time-seismic-depth interval velocity curve and the interval velocity difference curve.

10. The program carrier device of claim 9, wherein the time-seismic-depth interval velocity curve is computed by:

computing a time value for each respective true vertical depth value in the depth-depth curve;

computing a time-seismic-depth interval velocity value for each computed time value using a respective time value and a respective seismic depth value from the depth-depth curve; and building the time-seismic-depth interval velocity curve using each time-seismic-depth interval velocity value.

11. The program carrier device of claim 10, wherein each time value is computed by linearly interpolating a time value using two pairs of time-vertical depth values in a time-depth curve for each respective true vertical depth value in the depth-depth curve.

12. The program carrier device of claim 10, wherein the time-seismic-depth interval velocity curve is built by setting time-seismic depth interval velocity values over respective intervals of the true vertical depth values from the depth-depth curve.

13. The program carrier device of claim 9, further comprising validating the depth-depth curve using a correlation coefficient that represents a measure of similarity between a seismic-depth converted synthetic trace and depth seismic data.

14. The program carrier device of claim 13, wherein validating the depth-depth curve comprises determining whether the correlation coefficient, the time-seismic-depth interval velocity curve and the interval velocity difference curve are acceptable.

15. The program carrier device of claim 14, further comprising:
    editing the depth-depth curve; and
    repeating the steps in claim 9 until the correlation coefficient, the time-seismic-depth interval velocity curve and the interval velocity difference curve are acceptable.

16. The program carrier device of claim 15, wherein the depth-depth curve is edited by adjusting one of one or more of the seismic depth values in the depth-depth curve while maintaining each respective true vertical depth value and one or more of the true vertical depth values in the depth-depth curve while maintaining each respective seismic depth value.

17. A non-transitory program carrier device tangibly carrying computer-executable instructions for validating a depth-depth curve that is used to calibrate seismic depths to true vertical depths, the instructions being executable to implement;
    computing a time-seismic-depth interval velocity curve using the depth-depth curve and a computer system;
    building an interval velocity difference curve using a difference between a time depth interval velocity curve and the time-seismic-depth interval velocity curve; and
    validating the depth-depth curve using the time-seismic-depth interval velocity curve, the interval velocity difference curve and a correlation coefficient.

18. The program carrier device of claim 17, wherein validating the depth-depth curve comprises determining whether the correlation coefficient, the time-seismic-depth interval velocity curve and the interval velocity difference curve are acceptable.

19. The program carrier device of claim 18, further comprising:
    editing the depth-depth curve; and
    repeating the steps in claim 1 until the correlation coefficient, the time-seismic-depth interval velocity curve and the interval velocity difference curve are acceptable.

20. The program carrier device of claim 19, wherein the depth-depth curve is edited by adjusting one of one or more of the seismic depth values in the depth-depth curve while maintaining each respective true vertical depth value and one or more of the true vertical depth values in the depth-depth curve while maintaining each respective seismic depth value.

* * * * *